United States Patent [19]

Arai et al.

[11] Patent Number: 4,951,551
[45] Date of Patent: Aug. 28, 1990

[54] VARIABLE DISPLACEMENT HYDRAULIC MOTOR

[75] Inventors: Mitsuru Arai; Yoshikazu Nagahara, both of Yokohama, Japan

[73] Assignee: Kabushiki Kaisha Komatsu Seisakusho, Tokyo, Japan

[21] Appl. No.: 299,922

[22] Filed: Nov. 18, 1988

[30] Foreign Application Priority Data

Mar. 20, 1987 [JP] Japan .................. 62-64382

[51] Int. Cl.$^5$ .................. F03C 1/06; F04B 1/24; F04B 1/26; F04B 1/30
[52] U.S. Cl. .................................. 91/506
[58] Field of Search .................. 91/504, 505, 506

[56] References Cited

U.S. PATENT DOCUMENTS

| 4,007,662 | 2/1977 | Deininger | 91/504 |
| 4,434,709 | 3/1984 | Grelsson | 91/506 |

FOREIGN PATENT DOCUMENTS

| 3217484 | 10/1982 | Fed. Rep. of Germany | 91/506 |
| 3526496 | 1/1987 | Fed. Rep. of Germany | 91/506 |
| 133973 | 10/1981 | Japan | |
| 2043181 | 10/1980 | United Kingdom | 91/505 |

Primary Examiner—Leonard E. Smith
Attorney, Agent, or Firm—Armstrong, Nikaido, Marmelstein, Kubovcik & Murray

[57] ABSTRACT

A variable displacement hydraulic motor is easily mounted on a power shovel without interfering with a truck frame of the power shovel and without projecting outward therefrom. The hydraulic motor is easily assembled and machined in its manufacturing. In the hydraulic motor (M'), there is provided an end cover (57) in which is slidably mounted a piston lever (69) which is oppositely disposed from a drive shaft (44) of the hydraulic motor (M') to extend in a direction perpendicular to an axis of the drive shaft (44). Since the hydraulic motor (M') is provided with a valve plate swinging unit having a pin (71) through which the piston lever is connected with a valve plate (59) fixedly mounted on a cylinder block (60), it is possible to directly mount the end cover (57) on a main casing (50) of the hydraulic motor (M') so as to be perpendicular to the axis of the drive shaft (44).

1 Claim, 5 Drawing Sheets

VARIABLE DISPLACEMENT HYDRAULIC MOTOR

FIELD OF THE INVENTION

The present invention relates to a variable displacement hydraulic motor serving as a hydraulic drive motor mounted in a power shovel.

BACKGROUND OF THE INVENTION

As one of variable displacement hydraulic motors, there is a bent-axis type axial-piston motor such as one disclosed, for example in U.S. Pat. No. 3,961,563.

In FIG. 1, the reference character M denotes such bent-axis type axial-piston motor provided with a motor housing which is constructed of a main casing 1, a motor casing 2 and an end cover 3, as shown in FIG. 1. In the motor housing is obliquely mounted a cylinder block 6 so that an axis of the cylinder block 6 forms a tilt angle with an axis of a drive shaft 7, which tilt angle is variable within a range of from 7.5° to 30° while controlled by moving a convex portion of a valve plate 8 relative to an inner concave portion 9 of the end cover 3 in a swinging manner.

As the tilt angle is controlled, the stroke of each of a plurality of pistons 4 is so controlled as to make it possible to change a rotational speed of the drive shaft 7 in a condition in which an output horsepower of the drive shaft 7 is kept constant, provided that an amount of hydraulic oil supplied to the hydraulic motor M is kept constant.

On the other hand, in a power shovel, as shown in FIG. 1, a sleeve-like housing 12 is fixedly mounted in a bore 11 of a truck frame 10. A hub 14 fixed to a sprocket 13 is rotatably mounted on an outer peripheral portion of the housing 12 in which the hydraulic drive motor M is housed. The drive shaft 7 of the drive motor M is connected to the hub 14 through a reduction-gear mechanism 15 so that the sprocket 13 is driven by the hydraulic drive motor M.

As shown in FIG. 1, in the hydraulic drive motor M which is one of the conventional variable displacement hydraulic motors, since a slider element 3a for moving the valve plate 8 in a swinging manner is engaged with a central portion of the valve plate 8, it is impossible for the slider element 3a to smoothly swing the valve plate 8 in a direction perpendicular to an axis of the drive shaft 7. Consequently, as is clear from FIG. 1, the valve plate 8 is moved in a swinging manner by the slider element 3a in a direction slightly obliquing from the former direction perpendicular to the axis of the drive shaft 7.

The above arrangement of the slider element 3a requires the end cover 3 to be mounted in a tilting condition, which increases the entire length of the end cover 3 and causes the motor casing 2 to be mounted in a tilting condition too to make its machining operation difficult in manufacturing.

On the other hand, in case that the abovementioned variable displacement hydraulic motor is employed as the hydraulic drive motor M, since the overall length of the drive motor M is large, a part of the drive motor M projects outward from the truck frame 10 to often interfere with obstacles such as rock and the like. In addition, in this case, since the end cover 3 is obliquely mounted, the end cover 3 tends to interfere with the truck frame 10, which makes it difficult to mount the hydraulic drive motor M in the truck frame 10, and, therefore requires a complicated mounting construction for mounting the drive motor M in the truck frame 10.

SUMMARY OF THE INVENTION

Under such circumstances, the present invention is made so that it is an object of the present invention to provide a variable displacement hydraulic motor which does not interfere with a truck frame, nor does it project outward from the truck frame to make it possible to easily mount the hydraulic motor in the truck frame and to easily assemble and machine the hydraulic motor in manufacturing.

It is another object of the present invention to provide a variable displacement hydraulic motor in which a valve plate is smoothly moved in a swinging manner, and an end cover is so mounted as to be perpendicular to an axis of a drive shaft of the hydraulic motor.

In order to accomplish the above objects of the present invention, according to the present invention, there is provided:

A variable displacement hydraulic motor comprising: an end cover fixedly mounted on an end surface of a substantially cylindrical main casing; a drive shaft rotatably mounted in said main casing; a center shaft and a plurality of pistons, an end portion of each of which shaft and pistons is swingably engaged with a flange portion of said drive shaft, the flange portion being formed in a rear-end portion of said drive shaft; a cylinder block for slidably receiving the other end portion of each of said pistons therein, said cylinder block being provided with a through-hole through which said center shaft passes, the through-hole being formed in a central portion of said cylinder block; a valve plate fixedly mounted on a base-end portion of said cylinder block, said valve plate being provided with a central portion in which the other end portion of said center shaft is rotatably mounted; guide means for swingably guiding said valve plate, said guide means being provided in opposite sides of an inner portion of said end cover; a swinging means for moving said valve plate in a swinging manner, said swinging means being provided with a piston lever slidably mounted in a substantially central portion of said end cover to extend in a direction perpendicular to an axis of said drive shaft; and a pin for connecting said swinging means with said valve plate.

It is possible for anyone skilled in the art to understand the above objects, other objects, advantages and preferred embodiments of the present invention which will be clarified hereinafter with reference to the following description and the accompanying drawings.

DESCRIPTION OF THE PREFERRED EMBODIMENTS

Now, with reference to FIGS. 2 to 5 of the accompanying drawings, the present invention will be described hereinbelow in detail.

Figure 1:
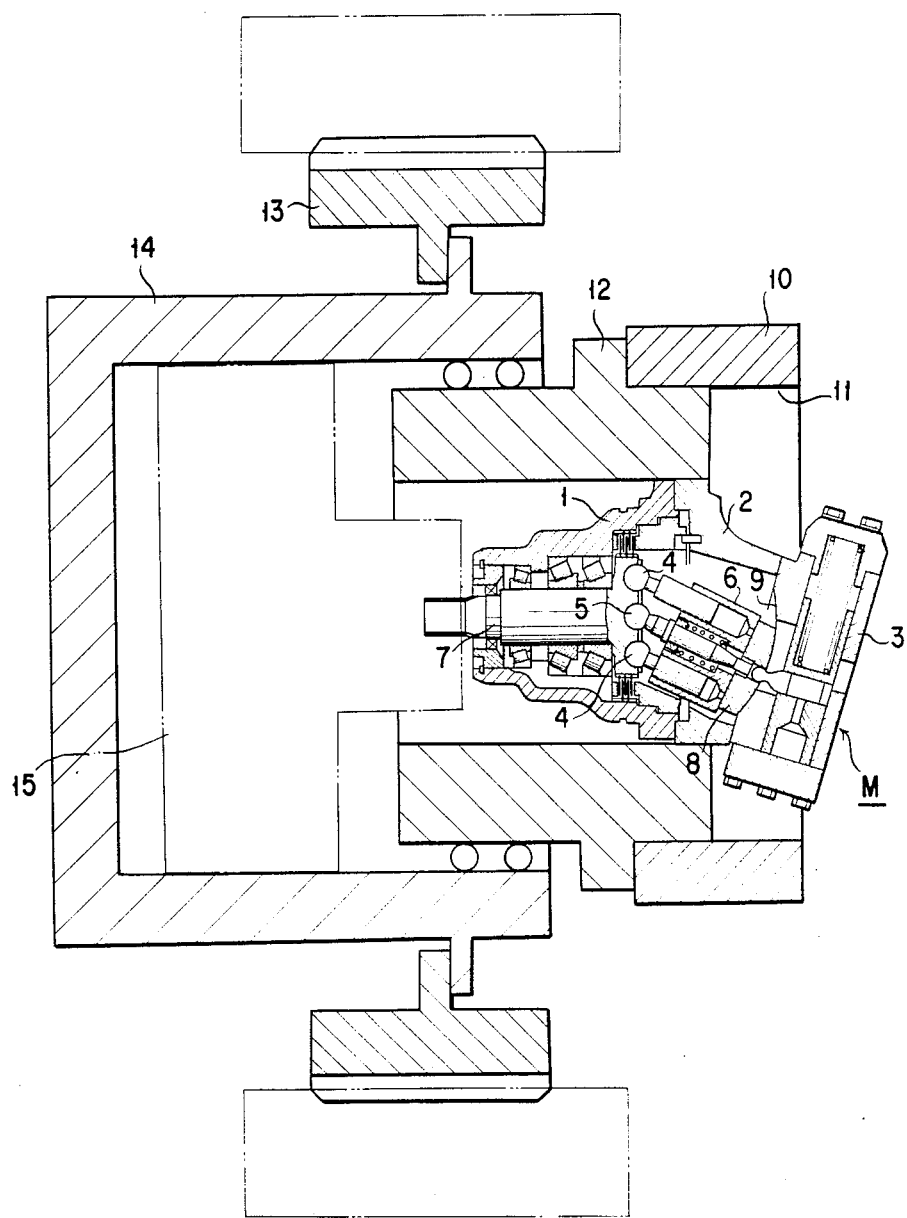
FIG. 1 is a schematic longitudinal sectional view of a motor-mounting portion of a power shovel, in which portion a conventional bent-axis type axial-piston hydraulic motor is mounted.
Figure 2:
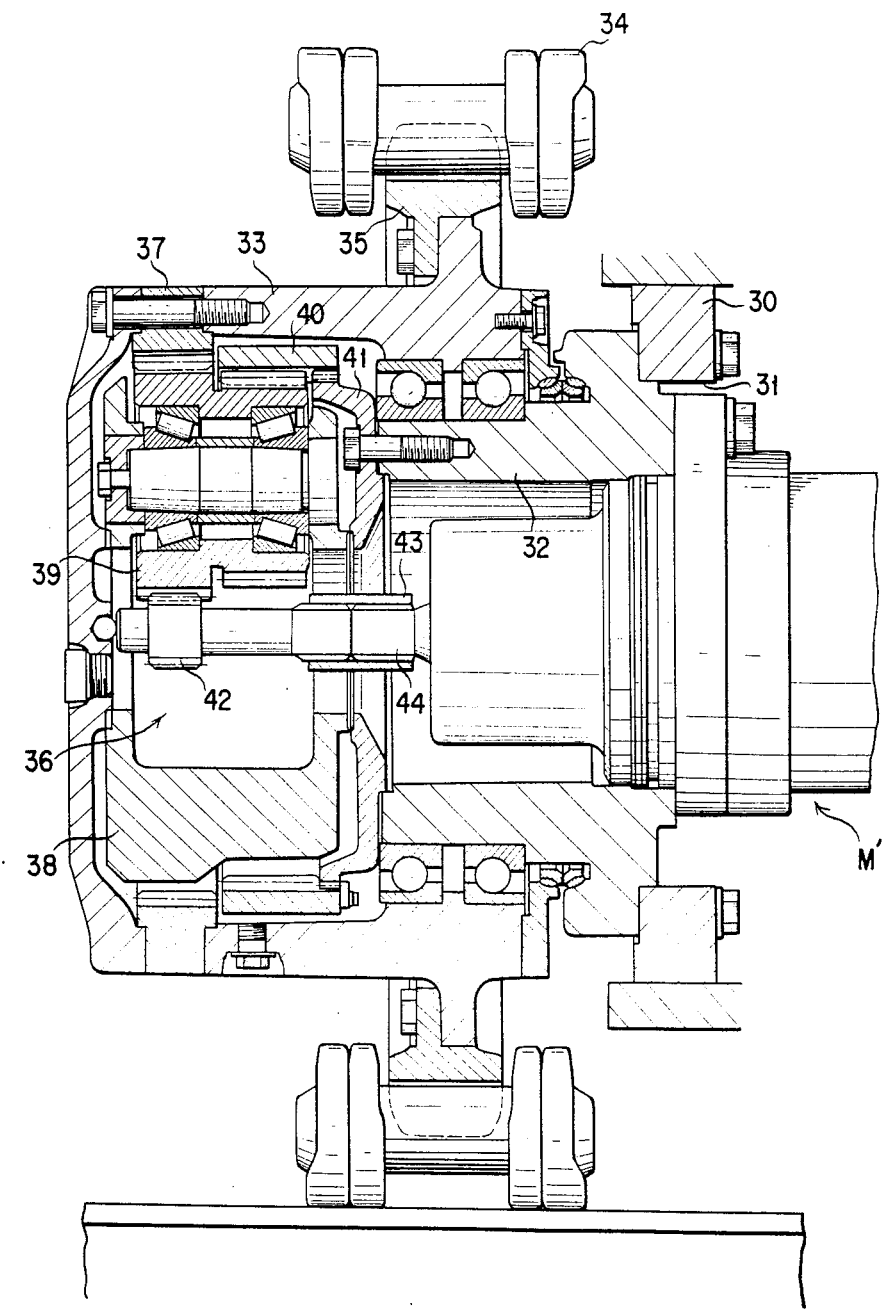
FIG. 2 is a schematic longitudinal sectional view of a motor-mounting portion of a power shovel, in which portion a bent-axis type axial-piston motor constituting a variable displacement hydraulic motor of the present invention is mounted.

FIG. 2 is a schematical longitudinal sectional view of a motor-mounting portion of a power shovel, in which portion a variable displacement hydraulic drive motor M' is mounted. In the motor-mounting portion of the power shovel shown in FIG. 2, a sleeve-like housing 32 is fixedly mounted in a hole 31 of a track frame 30 of the power shovel. A hub 33 is rotatably mounted on an outer peripheral portion of the housing 32. Fixedly mounted on the hub 33 is a sprocket 35 for driving a caterpillar 34 of the power shovel. Also fixedly mounted on the hub 33 is a first ring gear 37 which is a component of a reduction-gear mechanism 36.

The first ring gear 37 is meshed with a planet gear 39 which is rotatably mounted on a planet carrier 38. The planet gear 39 is meshed with a second ring gear 40 which is meshed with a gear 41 fixedly mounted on the housing 32. On the other hand, a sun gear 42 is connected to a drive shaft 44 of the variable displacement hydraulic motor M' through a coupling 43. Consequently, when the drive shaft 44 rotates, the sun gear 42 is rotatably driven by the drive shaft 44 so that the planet gear 39 is so driven that it not only rotates about its own axis but at the same time its axis rotates about an axis of the second ring gear 40. At the same time, the first ring gear 37 is rotatably driven by the planet gear 39 to drive the hub 33 together with the sprocket 35.

Figure 3:
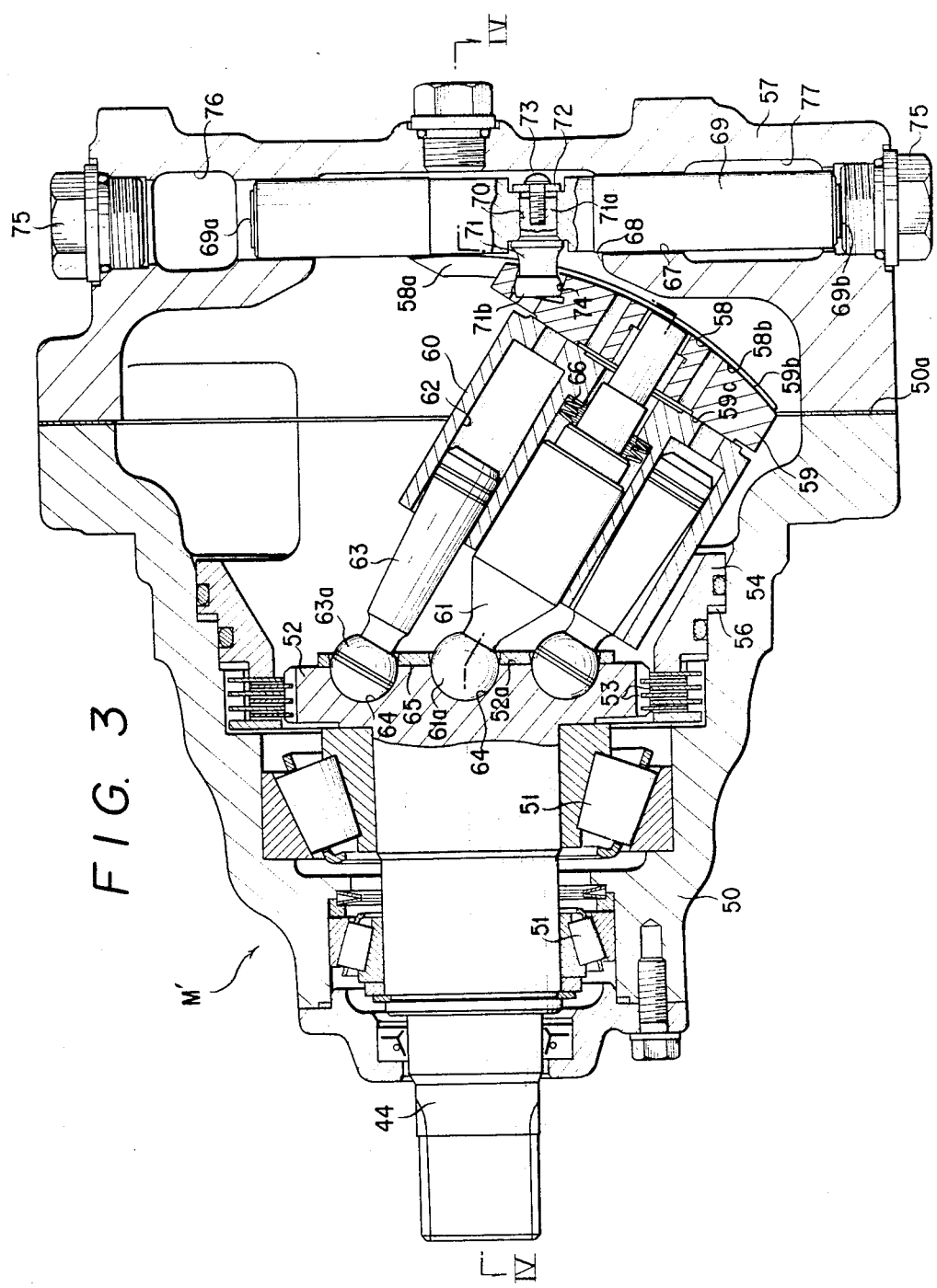
FIG. 3 is a schematic longitudinal sectional view of the bent-axis type axial-piston motor constituting the variable displacement hydraulic motor of the present invention.
Figure 4:
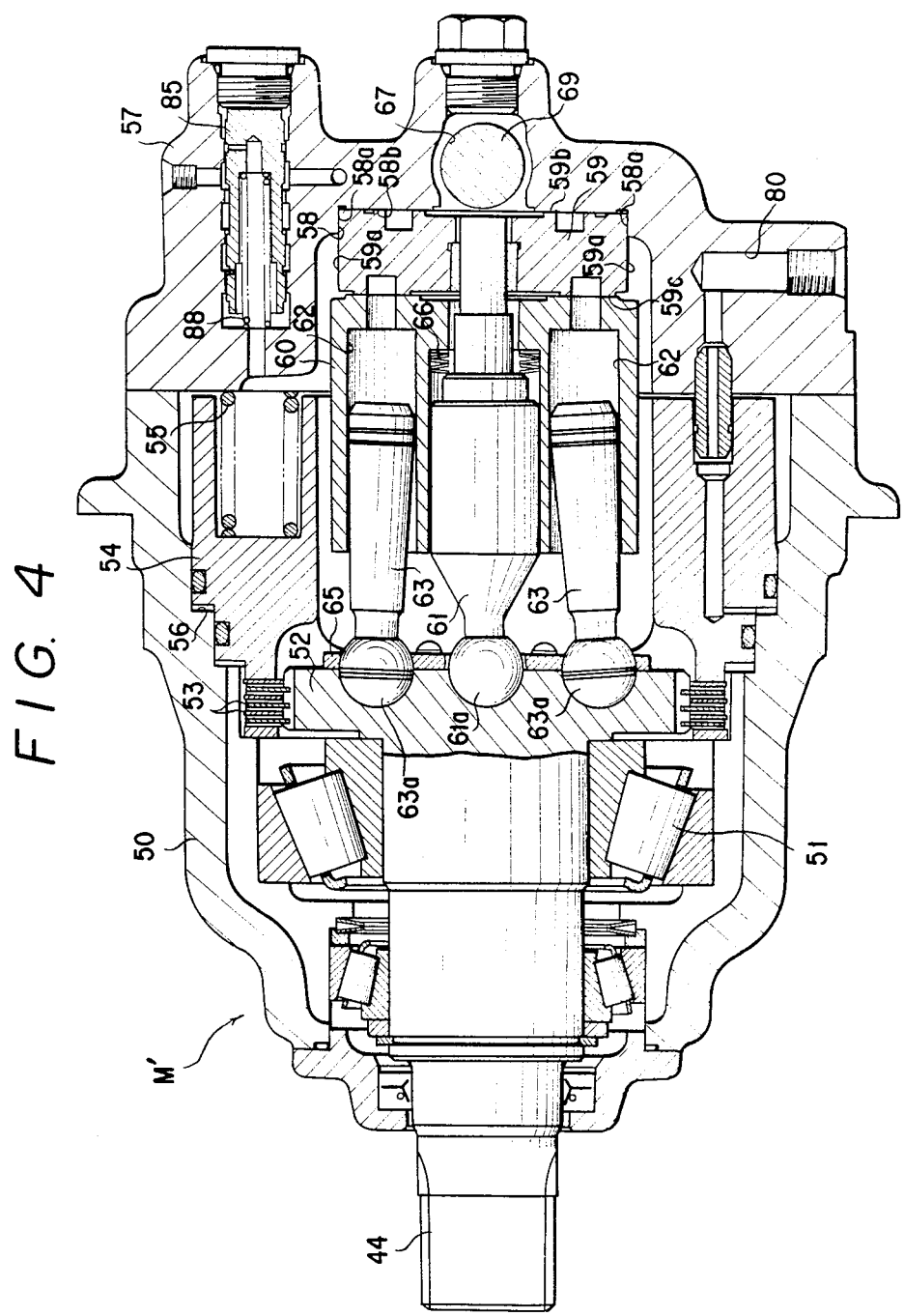
FIG. 4 is another schematic longitudinal sectional view of the bent-axis type axial-piston motor constituting the variable displacement hydraulic motor of the present invention, taken along the line 1V—1V of FIG. 3.
Figure 5:
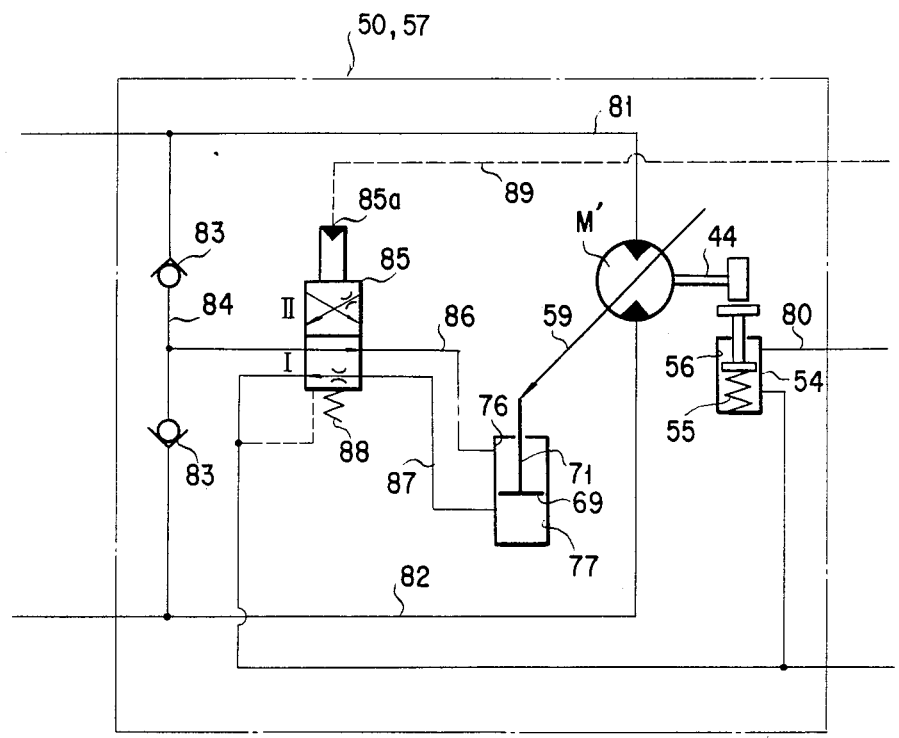
FIG. 5 is a diagram of a hydraulic circuit for the variable displacement hydraulic motor of the present invention.

The variable displacement hydraulic motor M' has a construction shown in FIGS. 3 to 5.

Namely, in the interior of a cylindrical main casing 50 of the hydraulic motor M', the drive shaft 44 is rotatably mounted on an end portion of the main casing 50 through a bearing 51. Brake disks 53 are alternately splined to both of an outer peripheral surface of a base-end flange portion 52 of the drive shaft 44 and an inner peripheral surface of an intermediate portion of the main casing 50 to make it possible to rotate the former and the latter together when the brake disks 53 are pressed to each other by actuating a piston 54 slidably mounted in the other end portion in the interior of the main casing 50. The piston 54 is normally pressed against the brake disks 53, while actuated under the influence of a pressurized oil contained in a pressure chamber 56 to release the brake disks 53 from a pressure applied thereto. A brake mechanism of the reduction-gear mechanism 36 has the above construction.

An end cover 57 is fixedly mounted on an end surface 50a of the main casing 50, which end surface 50a is disposed in a position near the base-end portion of the drive shaft 44 as shown in FIG. 3. In an inner lower portion of the end cover 57, there is provided a concave guide portion 58 which is symmetrical with respect to the axis of the drive shaft 44 and extends in parallel therewith. The concave guide portion 58 is constructed of: a pair of guiding side surfaces 58a extending in parallel with each other; and an arc-shaped curved guiding bottom surface 58b formed between the pair of the guiding side surfaces 58a. A valve plate 59 is swingable along the concave guide portion 58. Opposite side surfaces 59a of the valve plate 59 are brought into contact with the guiding side surfaces 58a of the concave guide portion 58, while an arc-shaped bottom surface 59b of the valve plate 59 is brought into contact with the guiding bottom surface 58b of the concave guide portion 58.

An end portion of a center shaft 61 rotatably mounted in a cylinder block is rotatably mounted in the valve plate 59. Both of a ball-like portion 61a of the center shaft 61 and a ball-like portion 63a of each of the pistons 63 slidably inserted into cylinder bores 62 of the cylinder block 60 are swingably mounted in ball-like concave portions 64 of the end surface 52a of the base-end flange portion 52 of the drive shaft 44 through a holding plate 65. On the other hand, the cylinder block 60 is pressed against a front surface 59c of the valve plate 59 by a spring 66.

A bore 67 is so formed in the end cover 57 as to extend in a direction perpendicular to the axis of the drive shaft 44, whereby the bore 67 is oppositely disposed from the drive shaft 44. An axial central portion of the bore 67 opens into the guide portion 58 in a notch portion 68 of the end cover 57. On the other hand, a base portion 71a of a pin 71 is fixedly mounted in a small bore 70 formed in an axial central portion of a piston lever 69 slidably mounted in the bore 67, which pin 71 is fixed to the small bore 70 by means of a plate 72 and a screw 73 as shown in FIG. 3. A front-end portion of the pin 71 assumes a ball-like form and extends forward from the notch portion 68 of the end cover 57 so as to be slidably mounted in a cylindrical bore 74 which is formed in an end portion of the valve plate 59, the end portion being disposed in a position near the axis of the drive shaft 44.

A blank plug 75 is threadably engaged with opposite end portions of the bore 67 to form a first chamber 76 and a second chamber 77 which are communicated with the above opposite end portions of the bore 67 at opposite end surfaces 69a and 69b, respectively. When the pressurized oil is supplied to one of these chambers 76 and 77, the piston lever 69 is slidably moved upward or downward in FIG. 3 to move the pin 71 vertically, so that the valve plate 59 is moved along the concave guide portion 58 in a swinging manner, whereby the axis of the cylinder block 60 forms a tilt angle with the axis of the drive shaft 44, which tilt angle is variable.

When the piston lever 69 is slidably moved in the bore 67, the front-end portion 71b of the pin 71 is slightly moved in a sliding manner in a direction parallel to the axis of the drive shaft 44 in the bore 74 of the valve plate 59.

FIG. 5 is a diagram of a hydraulic circuit for the hydraulic drive motor M'. A pressurized oil is supplied from a port 80 to the pressure chamber 56 of the above-mentioned brake mechanism. On the other hand, each of a first oil passage 81 and a second oil passage 82 is communicated with the variable displacement hydraulic motor M' while communicated with a by-pass passage 84 which is provided with a pair of check valves 83. The by-pass passage 84 is so controlled through a pilot valve 85 as to be communicated with a first 86 and a second 87 oil ports. The first oil port 86 is communicated with the first chamber 76 of the piston lever 69, while the second oil port 87 is communicated with the second chamber 77 of the piston lever 69. The pilot valve 85 is normally held in its first position "I" by means of a spring 88. When a pressurized oil is supplied to a pressure portion 85a of the pilot valve 85 through a pilot channel 89, the pilot valve 85 is moved to its second position "I". When the pressurized oil is not supplied to the pressure portion 85a of the pilot valve 85, the pilot valve 85 returns to its first position "I". When the pressurized oil contained in one of the oil passages 81 and 82 is supplied to the first chamber 76 of the piston lever 69, the piston lever 69 is moved downward in FIG. 3, to make the tilt angle of the valve plate 59 maximum. When the pressurized oil is supplied to the pressure portion 85a of the pilot valve 85 through a pilot channel 89, the pilot valve 85 is moved to its second position "I" so that the pressurized oil contained in one of the first 81 and the second 82 oil passages are supplied to the second chamber 77, whereby the piston lever 69 is slidably moved upward in the bore 67 in FIG. 3 so as to make the tilt angle of the valve plate minimum.

Incidentally, the port 80, the first 81 and the second 82 oil passages, the by-pass passage, the first 86 and the second 87 oil channels and the pilot channel 89 are formed in the main casing 50 and the end plate 57. On the other hand, both of the check valves 83 and the pilot valve 85 are disposed between the main casing 50 and the end cover 57.

As is clear from the above description, in the variable displacement hydraulic motor of the present invention, in contrast with the conventional hydraulic motor, there is no need to mount the end cover obliquely on the main casing through the motor casing, and it is possible to directly mount the end cover 57 on the main casing 50 so as to be perpendicular to the axis of the drive shaft 44, which makes it possible to decrease the overall length of the hydraulic motor M'. Consequently, in case that the hydraulic motor M' is mounted on a sprocket-drive portion of the power shovel, there is no fear that the end cover 57 projects outward from the truck frame and interfers with the truck frame itself. Consequently, there is no need to introduce a special machining operations in manufacturing of the hydraulic motor M' of the present invention to make it possible to easily mount the hydraulic motor M' of the present invention on the power shovel.

In addition, in the hydraulic motor M' of the present invention, since the end cover 57 is so arranged as to be perpendicular to the axis of the drive shaft 44, it is possible to mount the end cover 57 on the main casing in an easy manner. Further, it is also possible to form the main casing 50 into a simple cylindrical form having no oblique portion, which makes it possible to easily assemble and machine the hydraulic motor M' of the present invention in its manufacturing.

What is claimed is:

1. A variable displacement hydraulic motor comprising: an end cover fixedly mounted on an end surface of a substantially cylindrical main casing; a drive shaft rotatably mounted in said main casing; a center shaft a plurality of pistons, an end portion of each of which shaft and pistons is swingably engaged with a flange portion of said drive shaft, the flange portion being formed in a rear-end portion of said drive shaft; a cylinder block for slidably receiving the other end portion of each of said pistons therein, said cylinder block being provided with a through-hole through which said center shaft passes, the through-hole being formed in a central portion of said cylinder block; a valve plate fixedly mounted on a base-end portion of said cylinder block, said valve plate being provided with a central portion in which the other end portion of said center shaft is rotatably mounted; guide means for swingably guiding said valve plate, said guide means being provided in opposite sides of an inner portion of said end cover; a swinging means for moving said valve plate in a swinging manner, said swinging means being provided with a piston lever slidably mounted in a substantially central portion of said end cover and extending in a direction perpendicular to an axis of said drive shaft; and a pin for connecting said swinging means with said valve plate, said pin being mounted in a small bore at its base portion, and has a ball-like form at its front end portion slidably in a substantially circular hole, said small bore being formed in an axial substantially central portion of said piston lever, said substantially circular hole being formed in an end portion of said valve plate at a position near an axis of said drive shaft and offset from an axis of said center shaft.

* * * * *